(12) United States Patent
Yamada et al.

(10) Patent No.: US 6,328,122 B1
(45) Date of Patent: Dec. 11, 2001

(54) HYBRID VEHICLE COMPRISING EMERGENCY DRIVE DEVICE

(75) Inventors: Yoshiaki Yamada; Jun Yamada; Hiroshi Ienaka, all of Ageo (JP)

(73) Assignee: Nissan Diesel Motor Co., LTD, Saitama (JP)

(*) Notice: Subject to any disclaimer, the term of this patent is extended or adjusted under 35 U.S.C. 154(b) by 0 days.

(21) Appl. No.: 09/050,900

(22) Filed: Mar. 31, 1998

(30) Foreign Application Priority Data

Nov. 21, 1997 (JP) .................................................... 9-321160

(51) Int. Cl.[7] .................................................. B60K 6/04
(52) U.S. Cl. ...................... 180/65.3; 180/65.2; 180/65.4; 477/5
(58) Field of Search .................. 180/65.2, 65.1, 180/65.3, 65.4, 65.6; 318/8; 701/22; 477/5, 6

(56) References Cited

U.S. PATENT DOCUMENTS

| | | | |
|---|---|---|---|
| 3,650,345 | * 3/1972 | Yardney | 180/65.2 |
| 4,335,429 | * 6/1982 | Kawakatsu | 180/65 |
| 5,644,200 | * 7/1997 | Yang | 180/65.2 |
| 5,704,440 | * 1/1998 | Urban et al. | 180/65.2 |
| 5,722,502 | * 3/1998 | Kubo | 180/65.2 |
| 5,775,449 | * 7/1998 | Moroto et al. | 180/65.7 |
| 5,846,155 | * 12/1998 | Taniguchi et al. | 180/65.2 |
| 5,905,346 | * 5/1999 | Yamada et al. | 180/65.2 |
| 5,915,489 | * 6/1999 | Yamaguchi | 180/65.2 |
| 5,935,040 | * 8/1999 | Tabata et al. | 180/65.2 |
| 5,993,350 | * 11/1999 | Lawrie et al. | 180/65.2 |
| 6,003,626 | * 12/1999 | Ibaraki et al. | 180/65.4 |

* cited by examiner

Primary Examiner—Lanna Mai
Assistant Examiner—Hau Phan
(74) Attorney, Agent, or Firm—Rabin & Berdo, P.C.

(57) ABSTRACT

A hybrid vehicle includes a generator driven by an internal combustion engine, a battery charged by the generator and an electric motor driven by the generator and the battery. A drive system transmits the output of the motor to wheels of the vehicle. When, and only when, adequate power cannot be provided by the motor to the wheels because of a fault, an emergency drive indicator issues a command to a power transmitting mechanism, which is responsive only to the command signal to directly transmit the output of the engine to the drive system.

6 Claims, 6 Drawing Sheets

HYBRID VEHICLE COMPRISING EMERGENCY DRIVE DEVICE

FIELD OF THE INVENTION

The present invention relates to a hybrid vehicle comprising an internal combustion engine and an electric motor as power source.

BACKGROUND OF THE INVENTION

A hybrid vehicle is known in the art comprising an internal combustion engine (ICE) and an electric motor as the power source in order to reduce the exhaust emissions of a vehicle.

Such a hybrid vehicle is disclosed for example by Japanese Patent Application Tokkai Hei 9-103001 published by the Japanese Patent Office in 1997. In this prior art, an ICE and an electric motor are both mechanically connected to wheels, and the wheels are driven by both the ICE and the electric motor. Therefore, the wheels can be driven by the ICE even if the electric motor breaks down.

However, there is also a series type of hybrid vehicle wherein all the output from the ICE is converted into power by a generator and the wheels are driven only by the electric motor. In such a series type hybrid vehicle, as the wheels are not connected to the ICE mechanically, the ICE cannot transmit its output to the wheels when the electric motor breaks down even if there is no fault in the ICE, so the vehicle therefore cannot run at all.

SUMMARY OF THE INVENTION

It is therefore an object of this invention to enable a series type hybrid vehicle to run even when its motor breaks down.

In order to achieve the above object, this invention provides a series type hybrid vehicle comprising a generator driven by an internal combustion engine, a battery charged by the generator, an electric motor driven by the generator and the battery, and a drive system for transmitting the output of the electric motor to wheels. The hybrid vehicle further comprises emergency drive indicator means, and a power transmitting mechanism which directly transmits the output of the internal combustion engine to the drive system only when there is a command from the emergency drive indicator means.

According to an aspect of this invention, the hybrid vehicle further comprises a controller which holds the generator in a power generation stop state or a power generation minimum state and holds the electric motor in a neutral state when the output of the internal combustion engine is transmitted to the drive system via the power transmitting mechanism.

According to yet another aspect of this invention, the power transmitting mechanism comprises a torque converter and a clutch arranged in series with each other.

According to yet another aspect of this invention, the power transmitting mechanism comprises a torque converter and two clutches respectively provided on the input side and output side of the torque converter.

According to yet another aspect of this invention, the power transmitting mechanism further comprises direction change-over means, and a reversing mechanism which reverses the output rotation from the internal combustion engine and transmits it to the drive system when there is a command from the direction change-over means.

The details as well as other features and advantages of this invention are set forth in the remainder of the specification and are shown in the accompanying drawings.

DESCRIPTION OF THE PREFERRED EMBODIMENTS

Figure 1:
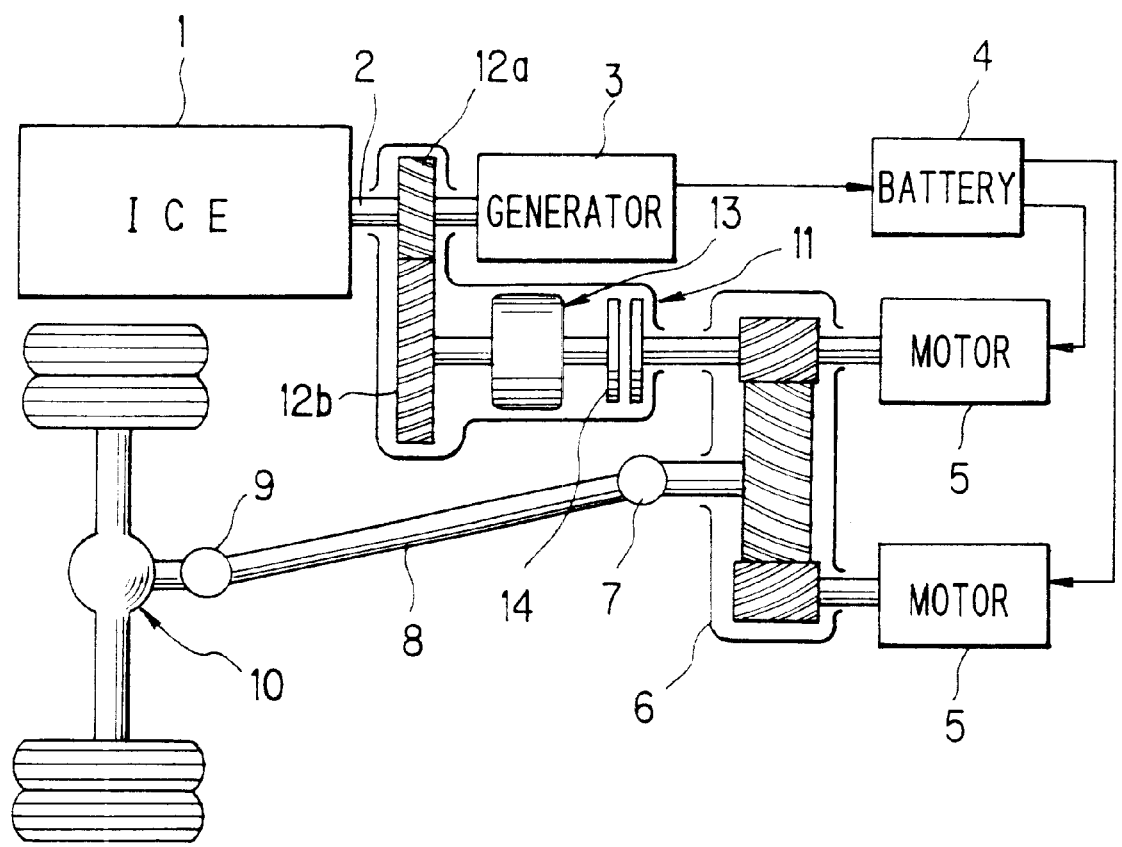
FIG. 1 shows the construction of a hybrid vehicle according to a first embodiment of this invention.

Referring to FIG. 1 of the drawings, a series type hybrid vehicle is equipped with an internal combustion engine (ICE) 1 and a generator 3 that is connected to an output shaft 2 of the ICE 1, a battery 4 for storing electric power generated by the generator 3, and a pair of electric motors 5 driven by the generator 3 and battery 4. The output of the electric motor 5 is transmitted to the wheels via a reduction gear 6, coupling 7, propeller shaft 8, coupling 9, and final drive 10.

A torque converter 13 is connected to the output shaft 2 of the ICE 1 via a pair of reducing gears 12a, 12b. A clutch 14 is further provided between the torque converter 13 and reduction gear 6. These gears 12a, 12b, torque converter 13 and clutch 14 comprise a power transmitting mechanism 11 for use in an emergency.

Figure 2:
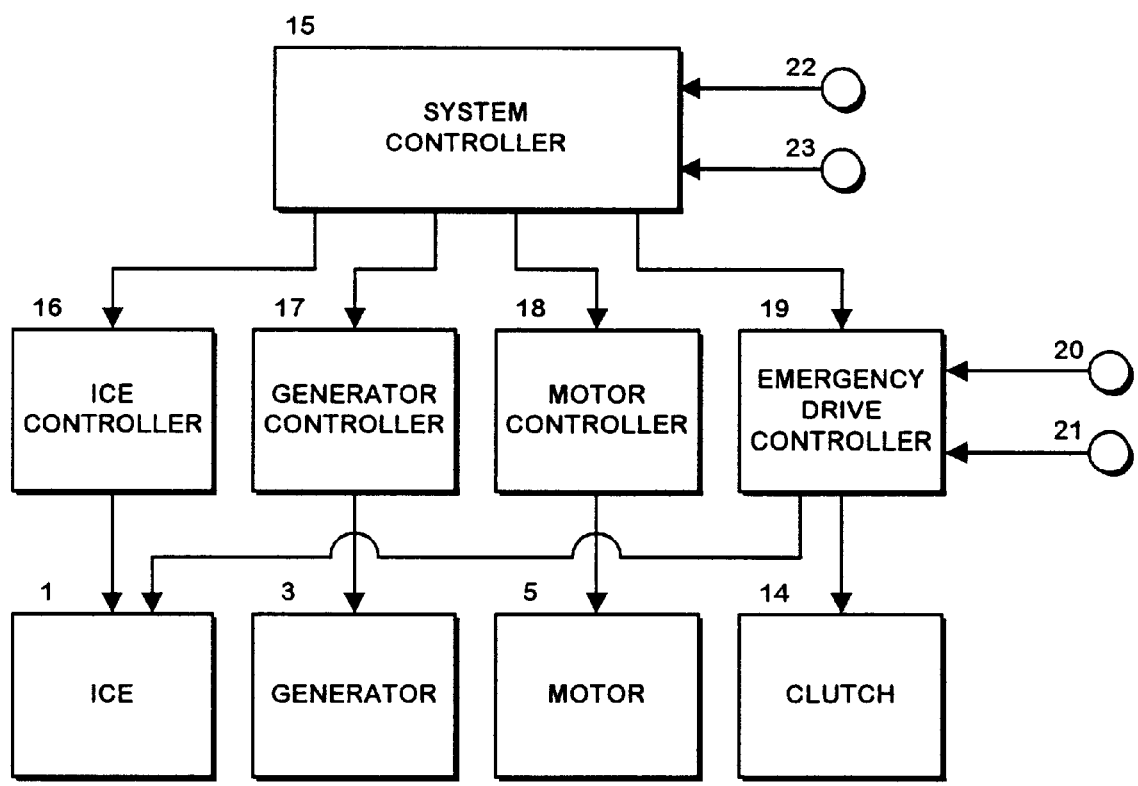
FIG. 2 is a block diagram of a controller of the hybrid vehicle.

This hybrid vehicle comprises a controller shown in FIG. 2. A system controller 15 controls the output of the ICE 1 via an ICE controller 16, controls the amount of power generated by the generator 3 via a generator controller 17, and controls the output of the electric motor 5 via a motor controller 18.

When a signal from an emergency drive switch 20 is input, for example when the electric motor 5 breaks down, the system controller 15 controls the output of the ICE 1, and engages or releases the clutch 14 via an emergency drive controller 19.

Signals are input to the system controller 15 from an accelerator pedal opening sensor 22 and vehicle speed sensor 23, and the system controller 15 performs emergency drive control in accordance with the signals.

Figure 3:
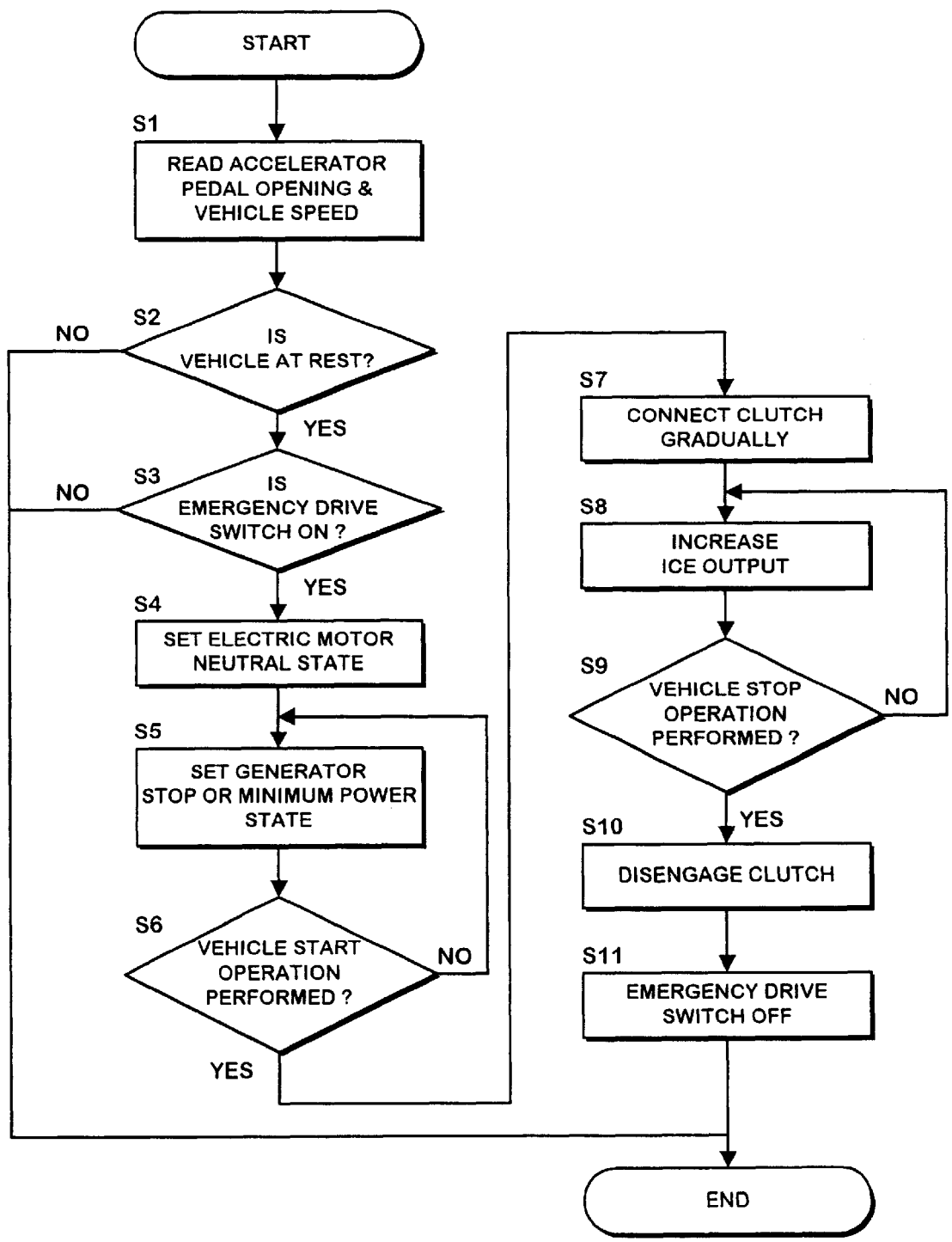
FIG. 3 is a flowchart for showing the operation of the controller.

FIG. 3 is a flowchart describing the operation of the system controller 15 in an emergency.

In a step S1, the accelerator pedal opening and vehicle speed are read. In a step S2, it is determined whether or not the vehicle is at rest based on the accelerator pedal opening and vehicle speed. When it is determined that the vehicle is at rest, the routine proceeds to a step S3. In the step S3, it is determined whether or not the emergency drive switch 20 is ON. When it is determined that the emergency drive switch 20 is ON, the electric motor 5 is set to a neutral state and the generator 3 is set to a power generation stop state or power generation minimum state respectively in steps S4, S5, and the routine proceeds to a step S6.

In the step S6, it is determined whether or not a vehicle start operation has been performed by determining whether or not the accelerator pedal opening has increased. When it is determined that there has been a start operation, the routine proceeds to steps S7, S8, the clutch 14 is gradually connected, and the output of the ICE 1 is increased according to the accelerator pedal opening.

After the vehicle has started and begun running, running is continued until it is determined that a vehicle stop operation has been performed. When it is determined, in a step S9, that the accelerator pedal opening is zero and the vehicle speed is equal to or less than a predetermined value (very low speed), i.e. that a stop operation has been performed, the clutch 14 is disengaged in a step S10, the emergency drive switch 20 is switched OFF in a step S11, and control is terminated.

Next, the operation of this hybrid vehicle will be described. During normal running, the ICE 1 drives only the generator 3. The electric motor 5 is driven by power supplied from the generator 3. The rotation speed of the electric motor 5 is controlled according to the accelerator pedal opening, and the rotation speed rises the more the accelerator pedal opening increases. As the clutch 14 is then released, the output of the ICE 1 is not transmitted to the electric motor 5 via the clutch 14.

On the other hand, when a fault occurs in the electric motor 5, the vehicle is first stopped, and when the emergency drive switch 20 is turned ON, a shift to the emergency drive mode takes place.

The generator 3 then enters the power generation stop state or power generation minimum state, and the electric motor 5 goes into the neutral state. When the driver steps on the accelerator pedal, the clutch 14 is gradually connected. The output of the ICE 1 is input to the reduction gear 6 via the clutch 14, and is transmitted to the wheels. As a result, the vehicle can be driven directly by the ICE 1 when, for example, the electric motor 5 breaks down.

When the accelerator pedal is released and the vehicle is slowed down, the clutch 14 is again released, so transmission of the output of the ICE 1 to the wheels is interrupted, and the vehicle can be brought to rest.

Therefore, even if the electric motor 5 breaks down, the vehicle can be safely moved to a required location.

As the output of the ICE 1 is input to the reduction gear 6 via the torque converter 13, the output of the ICE 1 can be increased and transmitted, and the drive force necessary to run the vehicle can be obtained even during emergency drive. Also as torque can be transmitted smoothly, transmission shocks can be reduced. The vehicle can still be moved smoothly even without the torque converter 13 provided that the clutch 14 is present.

During emergency drive, as the generator 3 is maintained in the power generation stop state or minimum power state, and the electric motor 5 is maintained in the neutral state, the output of the ICE 1 used to drive the generators and motor 5 can be reduced. As a result, nearly all the output of the ICE 1 can be used to drive the wheels, and good running performance is ensured.

Figure 4:
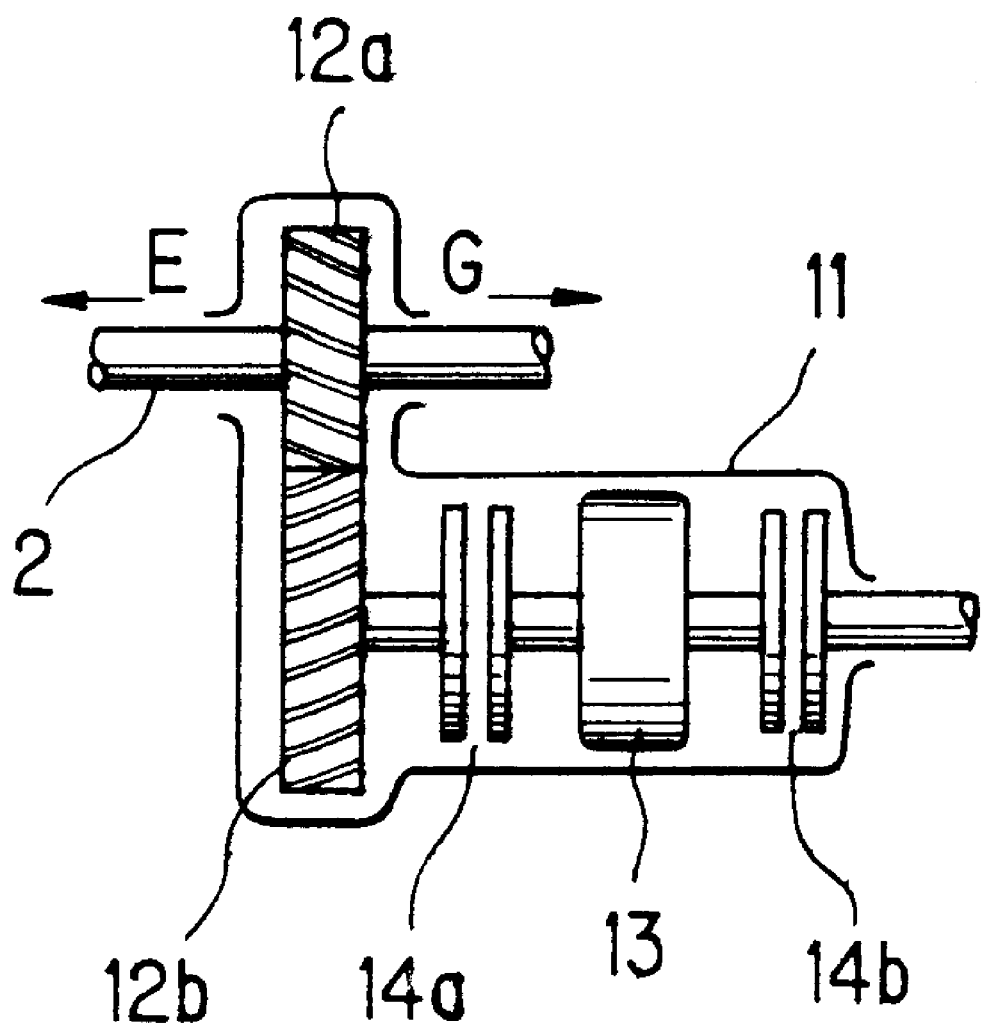
FIG. 4 shows the partial construction of a second embodiment of this invention.

FIG. 4 shows a second embodiment of this invention. This embodiment is different from the first embodiment in that clutches 14a and 14b are respectively provided on the input side and the output side of the torque converter 13.

According to this embodiment, the torque converter 13 can be kept completely separate from the ICE 1 and the electric motor 5 during normal running of the vehicle. Due to this, a loss of output of the ICE 1 which occurs due to driving the torque converter 13 during normal running, is eliminated.

Figure 5:
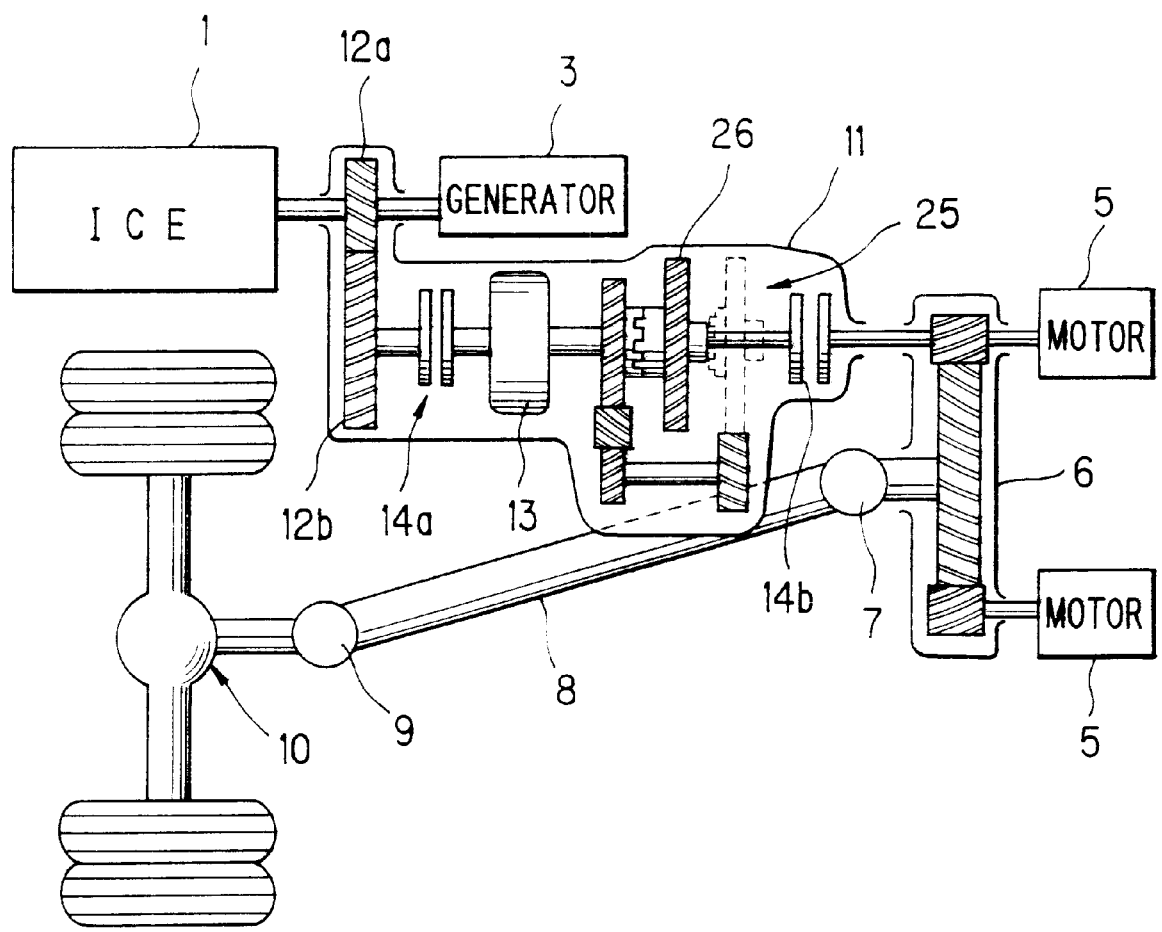
FIG. 5 is similar to FIG. 1, but showing a third embodiment of this invention.

FIG. 5 shows a third embodiment of this invention. This embodiment is different from the first embodiment in that a reversing mechanism 25 is interposed between the torque converter 13 and clutch 14b in addition to the torque converter 13 and clutches 14a, 14b. This reversing mechanism 25 is the same as the mechanism used to change-over to reverse gear of a transmission known in the art.

A signal selecting "forward" or "reverse" is input from a direction change-over switch 21 to the emergency drive controller 19. An actuator, not illustrated, displaces a moving engaging gear 26 according to the signal from this direction change-over switch 21, so as to change-over between a state wherein the output rotation of the ICE 1 is directly transmitted to the wheels, and a state wherein the output is reversed before transmitting to the wheels.

The vehicle can therefore be made to move not only forwards but also backwards, and the operability of the vehicle in an emergency improves.

Figure 6:
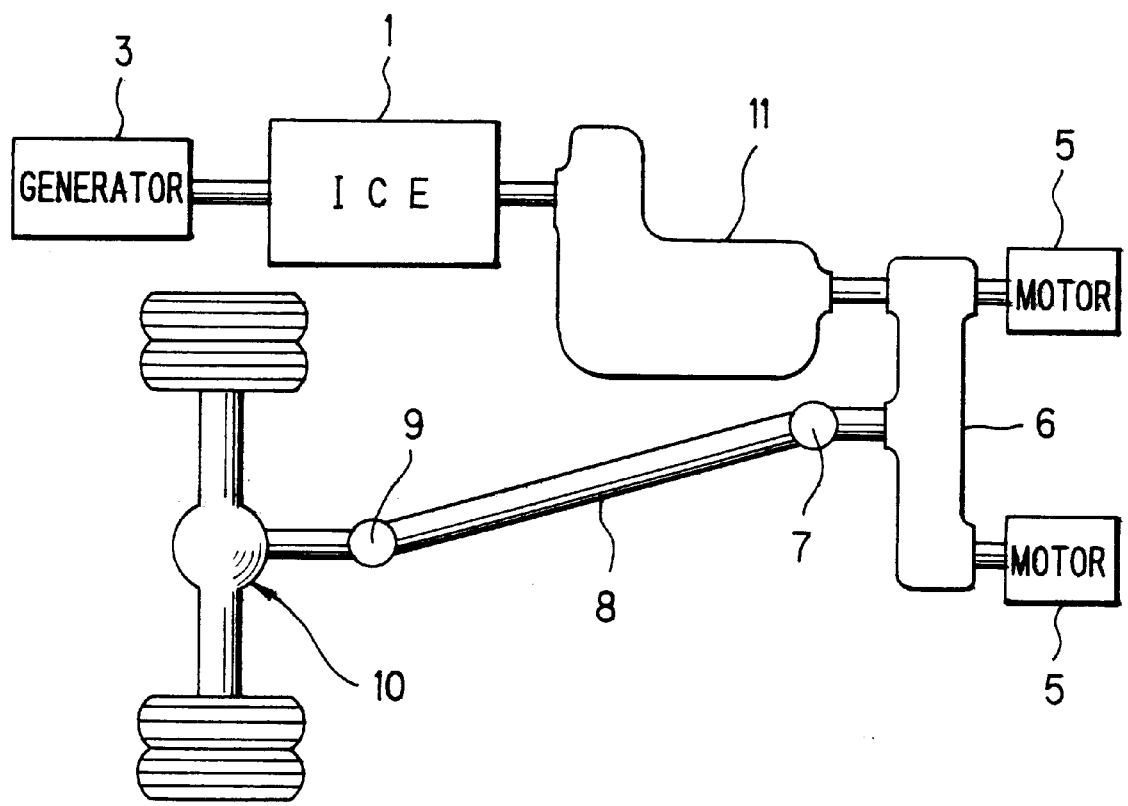
FIG. 6 is similar to FIG. 1, but showing a fourth embodiment of this invention.

FIG. 6 shows a fourth embodiment of this invention. This embodiment is different from the third embodiment in that the power transmitting mechanism 11 is provided on the opposite side of the generator 3. Due to this, there is more degree of freedom in the layout of the ICE 1 and the power transmitting mechanism 11.

The embodiments of this invention in which an exclusive property or privilege is claimed are defined as follows:

1. A series type hybrid vehicle, comprising:
   a generator driven by an internal combustion engine;
   a battery charged by said generator;
   an electric motor driven by said generator and said battery;
   a drive system for transmitting the output of said electric motor to wheels;
   emergency drive indicator means for issuing a command when there is a fault in the electric motor; and
   a power transmitting mechanism which directly transmits the output of said internal combustion engine to said drive system only when there is the command from said emergency drive indicator means,
   wherein said power transmitting mechanism comprising a torque converter and a clutch arranged in series with each other;
   wherein in the absence of the command from said emergency drive indicator means, all of the output of said internal combustion engine is used to drive said generator, and the wheels are only driven by said electric motor; and
   wherein when there is no fault in said electric motor, said internal combustion engine is only used to drive said generator.

2. A hybrid vehicle as defined in claim 1, further comprising a controller which holds said generator in a power generation stop state or a power generation minimum state and holds said electric motor in a neutral state when the output of said internal combustion engine is transmitted to said drive system via said power transmitting mechanism.

3. A hybrid vehicle as defined in claim 1, wherein said power transmitting mechanism comprises the torque converter and two clutches respectively provided on the input side and output side of said torque converter.

4. A hybrid vehicle as defined in claim 3, wherein said power transmitting mechanism comprises direction change-over means, and a reversing mechanism which reverses the output rotation from said internal combustion engine and transmits it to said drive system when there is a command from said direction change-over means.

5. The hybrid vehicle as defined in claim 1, wherein the output of said internal combustion engine is transmitted to said drive system without being transmitted via said electric motor.

6. A The hybrid vehicle as defined in claim 1, wherein when there is the command from said emergency drive indicator means, only the output from said internal combustion engine is transmitted to said drive system.

* * * * *